US011112633B2

(12) United States Patent
Mochiji et al.

(10) Patent No.: US 11,112,633 B2
(45) Date of Patent: Sep. 7, 2021

(54) DISPLAY APPARATUS AND METHOD FOR ASSEMBLING THE SAME

(71) Applicant: ALPINE ELECTRONICS, INC., Tokyo (JP)

(72) Inventors: Hiroyuki Mochiji, Iwaki (JP); Satoshi Hara, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/849,079

(22) Filed: Apr. 15, 2020

(65) Prior Publication Data

US 2020/0341325 A1    Oct. 29, 2020

(30) Foreign Application Priority Data

Apr. 26, 2019   (JP) ............... JP2019-085415

(51) Int. Cl.
*G02F 1/1333*    (2006.01)
*G02F 1/1335*    (2006.01)
*G02F 1/13357*    (2006.01)

(52) U.S. Cl.
CPC .. *G02F 1/133308* (2013.01); *G02F 1/133524* (2013.01); *G02F 1/133608* (2013.01); *G02F 1/13332* (2021.01); *G02F 1/133314* (2021.01); *G02F 1/133317* (2021.01); *G02F 1/133322* (2021.01); *G02F 1/133325* (2021.01); *G02F 1/133331* (2021.01)

(58) Field of Classification Search
CPC ......... G02F 1/133308; G02F 1/133608; G02F 1/133524; G02F 2001/133314; G02F 2001/133322; G02F 2001/13332; G02F 2001/133317; G02F 2001/133325; G02F 2001/133331; G02F 2201/54; G02F 2202/28; G02F 2001/133328; G02F 1/133331; G09G 2300/023; G09G 2300/026; H01L 27/3293; H01L 27/3267
See application file for complete search history.

(56) References Cited

U.S. PATENT DOCUMENTS

| | | | |
|---|---|---|---|
| 2013/0265504 A1 | 10/2013 | Sato et al. | |
| 2016/0259203 A1* | 9/2016 | Nishimoto | ........ G02F 1/133308 |
| 2016/0283183 A1* | 9/2016 | Bang | ................ G02F 1/13336 |
| 2018/0088394 A1* | 3/2018 | Notoshi | ............ G02F 1/133308 |
| 2019/0067411 A1* | 2/2019 | Lee | ................ H01L 51/0097 |

FOREIGN PATENT DOCUMENTS

| | | |
|---|---|---|
| JP | 2013-219518 | 10/2013 |
| JP | 2018-54941 | 4/2018 |

OTHER PUBLICATIONS

Extended European Search Report for 20170887.2 dated May 28, 2020, 7 pages.

* cited by examiner

*Primary Examiner* — Mariam Qureshi
(74) *Attorney, Agent, or Firm* — Brinks Gilson & Lione (57) ABSTRACT

A frame-shaped reinforcement member is bonded and fixed to a rear surface of a cover panel, such as a glass plate. The reinforcement member has a rigidity higher than that of the cover panel. Since the reinforcement member is provided, the flatness of flat portions of the cover panel can be maintained at a high level. The reinforcement member is bonded and fixed to a rear support member after display cell elements are bonded to the flat portions and backlights are fixed to the reinforcement member.

6 Claims, 7 Drawing Sheets

DISPLAY APPARATUS AND METHOD FOR ASSEMBLING THE SAME

RELATED APPLICATION

The present application claims priority to Japanese Patent Application Number 2019-085415, filed Apr. 26, 2019, the entirety of which is hereby incorporated by reference.

BACKGROUND

1. Field of the Invention

The present invention relates to a display apparatus mounted in a vehicle, for example, and including a light-transmissive cover panel and a display cell fixed to a rear surface of the cover panel, and also relates to a method for assembling the display apparatus.

2. Description of the Related Art

Japanese Unexamined Patent Application Publication No. 2013-219518 describes an invention relating to an electronic device including a display.

This electronic device includes a display and a panel larger than the display. The panel is fixed to a front surface of the display with a transparent adhesive. A portion of the panel that protrudes from the display is fixed to a front surface of a support portion provided behind the display with an adhesive.

According to the electronic device having the above-described structure, when the panel is fixed to the support portion, the panel is easily distorted due to the flatness tolerance of the panel or the tolerance in formation of the support portion. Since the display is fixed to the panel over the entire area thereof, stress is easily transmitted to the display from the panel. Accordingly, the display may be distorted and cause a reduction in the image quality. In particular, when the panel and the display are large, the display is distorted to a large degree and over a large area due to the panel, and the image quality is significantly reduced.

Japanese Unexamined Patent Application Publication No. 2018-54941 describes an invention relating to a liquid crystal display apparatus including a liquid crystal cell with reduced warpage to reduce degradation of the image quality due to warpage of the liquid crystal cell.

The liquid crystal display apparatus illustrated in FIG. 2 of Japanese Unexamined Patent Application Publication No. 2018-54941 includes a transparent reinforcement plate bonded to a lower surface of the liquid crystal cell in FIG. 2 with an adhesive layer provided therebetween. The transparent reinforcement plate is placed on a projecting portion of an intermediate frame with a non-adhesive cushioning material provided therebetween. Another cushioning material is provided between an upper surface of the liquid crystal cell and an upper frame in FIG. 2. Since the liquid crystal display apparatus is structured such that the reinforcement plate bonded to the liquid crystal cell is placed on the projecting portion of the intermediate frame with the cushioning material provided therebetween, the transparent reinforcement plate is not easily warped. Therefore, even when the liquid crystal cell is an in-plane switching (IPS) display cell, the occurrence of unevenness in black display can be reduced.

The liquid crystal display apparatus described in Japanese Unexamined Patent Application Publication No. 2018-54941 is structured such that the liquid crystal cell and the transparent reinforcement plate that are bonded together are sandwiched by the cushioning materials from above and below. Therefore, the liquid crystal cell cannot be stably fixed. In addition, in the case where a touch sensor or the like is placed on the front surface of the liquid crystal cell, the liquid crystal cell moves when a finger touches the display screen, and the touch sensor cannot be easily operated.

SUMMARY

The present disclosure has been made to solve the above-described problems of the related art, and an object of the present disclosure is to provide a display apparatus that includes a display cell installed in a fixed manner and in which warpage of a cover panel and the display cell is reduced, and a method for assembling the display apparatus.

According to the present disclosure, a display apparatus includes a display cell; a cover panel that is light-transmissive and that covers a portion of the display cell that faces in a forward direction, which is a displaying direction of the display cell; and a reinforcement member that is frame-shaped and has a rigidity higher than a rigidity of the cover panel, the reinforcement member being fixed to a rear surface of the cover panel that faces in a rearward direction. The display cell is fixed to the rear surface of the cover panel in a region surrounded by the reinforcement member.

Preferably, the display apparatus according to the present disclosure further includes a backlight device disposed behind the display cell, the backlight device being fixed to the reinforcement member, and at least one of the reinforcement member and the backlight device is fixed to a rear support member disposed behind the backlight device.

The display apparatus according to the present disclosure may be configured such that the cover panel includes a bent portion or a curved portion, and that the reinforcement member is fixed to the rear surface of the cover panel at either of the bent portion and a portion near the bent portion, or either of at least a portion of the curved portion and a portion near the curved portion.

In the display apparatus according to the present disclosure, preferably, the reinforcement member includes a partition portion that partitions an inner space of the frame-shaped reinforcement member, and at least a portion of the partition portion is fixed to the rear surface of the cover panel.

In the display apparatus according to the present disclosure, preferably, the partition portion includes a plurality of ribs that project rearward and extend in a direction in which the bent portion is bent or the curved portion is curved, and at least a portion of a rearward-facing end portion of each rib is fixed to the rear support member.

According to the present disclosure, a method for assembling a display apparatus including a display cell and a cover panel that is light-transmissive and that covers a portion of the display cell that faces in a forward direction, which is a displaying direction of the display cell, includes the steps of:

(a) fixing a reinforcement member that is frame-shaped and has a rigidity higher than a rigidity of the cover panel to a rear surface of the cover panel that faces in a rearward direction; and (b) fixing the display cell to the rear surface of the cover panel in a region surrounded by the reinforcement member after step (a).

Preferably, the method for assembling the display apparatus of the present disclosure further includes the steps of:

(c) fixing a backlight device disposed behind the display cell to the reinforcement member after the step (b); and (d) fixing at least one of the reinforcement member and the backlight device to a rear support member disposed behind the backlight device.

The method for assembling the display apparatus according to the present disclosure may be such that the cover panel includes a bent portion or a curved portion, and that the reinforcement member is fixed to the rear surface of the cover panel at either of the bent portion and a portion near the bent portion, or either of at least a portion of the curved portion and a portion near the curved portion in step (a).

According to the present disclosure, the frame-shaped reinforcement member is fixed to the rear surface of the cover panel. Therefore, the shape and flatness of the cover panel can be accurately set by the reinforcement member, and distortion of the display cell fixed to the rear surface of the cover panel can be reduced. Therefore, degradation of the image quality can be prevented.

In particular, when the cover panel has a three-dimensional shape including a bent portion or a curved portion, by fixing the reinforcement member to the rear surface of the cover panel, the dimensional accuracy of the three-dimensional shape of the cover panel can be maintained at a high level, and the flatness of the cover panel can also be maintained at a high level in a region in which the display cell is fixed. Therefore, distortion of the display cell, which is bonded to the cover panel over the entire area thereof, can be reduced.

DETAILED DESCRIPTION OF THE PREFERRED EMBODIMENTS

FIGS. 1 to 7 illustrate a display apparatus 1 mounted in a vehicle. In FIGS. 1 to 7, the Y1 direction is forward, which is a displaying direction, and the Y2 direction is rearward. The X1 direction is leftward, the X2 direction is rightward, the Z1 direction is upward, and the Z2 direction is downward.

The display apparatus 1 is fixed to an instrument panel or a dashboard located at the front of a cabin of an automobile or to a center console when in use. The display apparatus 1 is installed such that the Z1-Z2 direction thereof is vertical or at an angle such that the bottom thereof is shifted forward.

Figure 1:
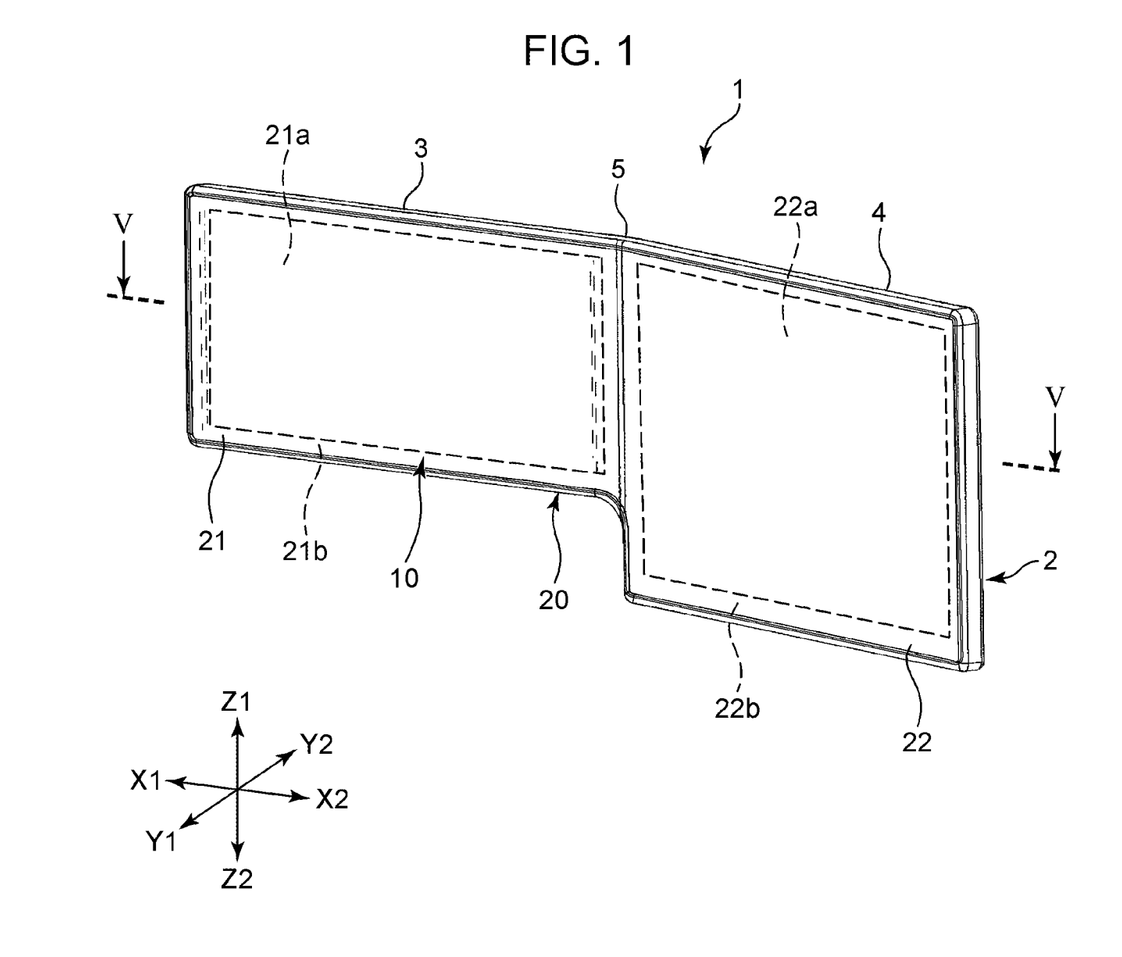
FIG. 1 is a front perspective view of a display apparatus according to an embodiment of the present invention.
Figure 2:
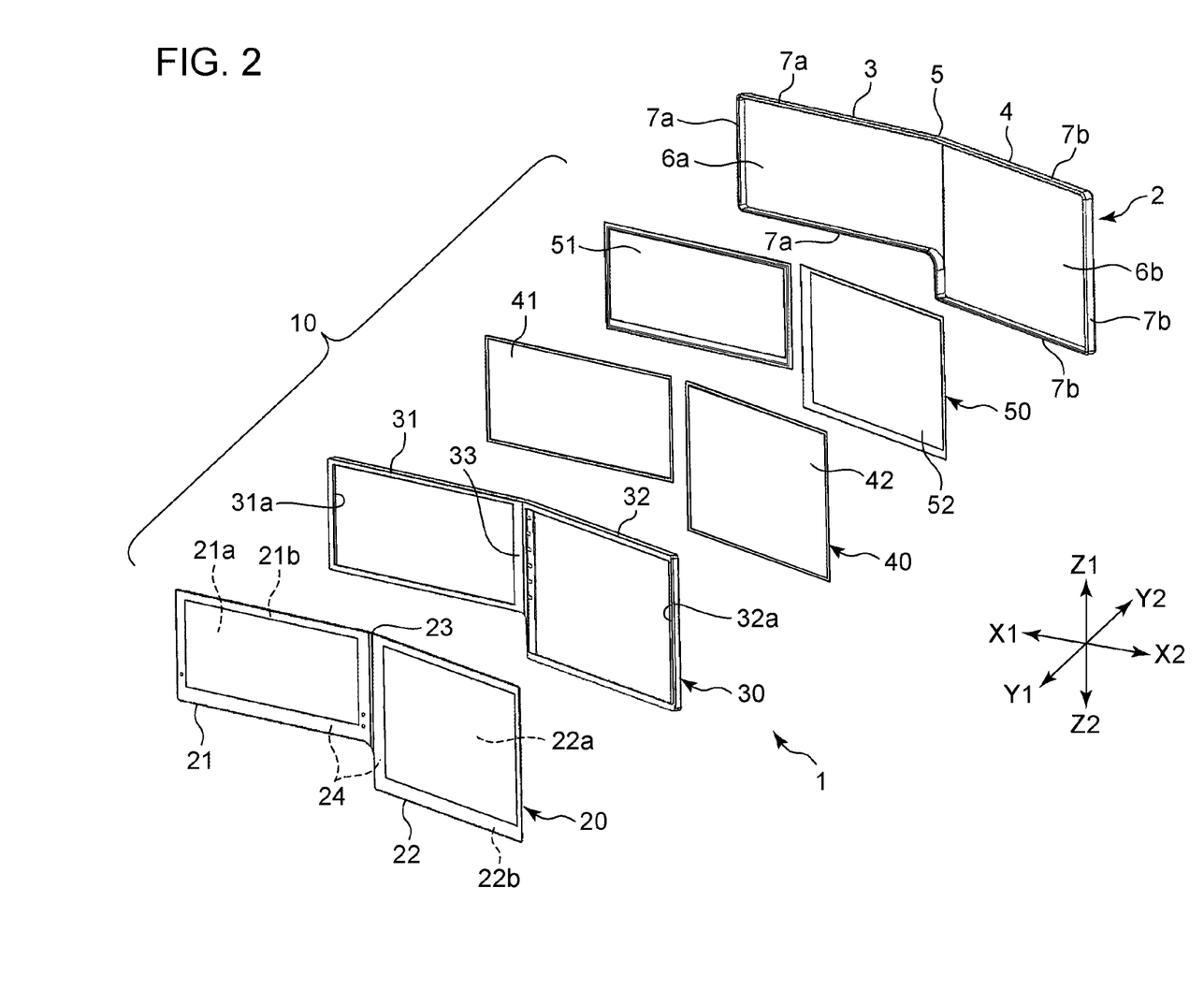
FIG. 2 is an exploded front perspective view of the display apparatus illustrated in FIG. 1.
Figure 3:
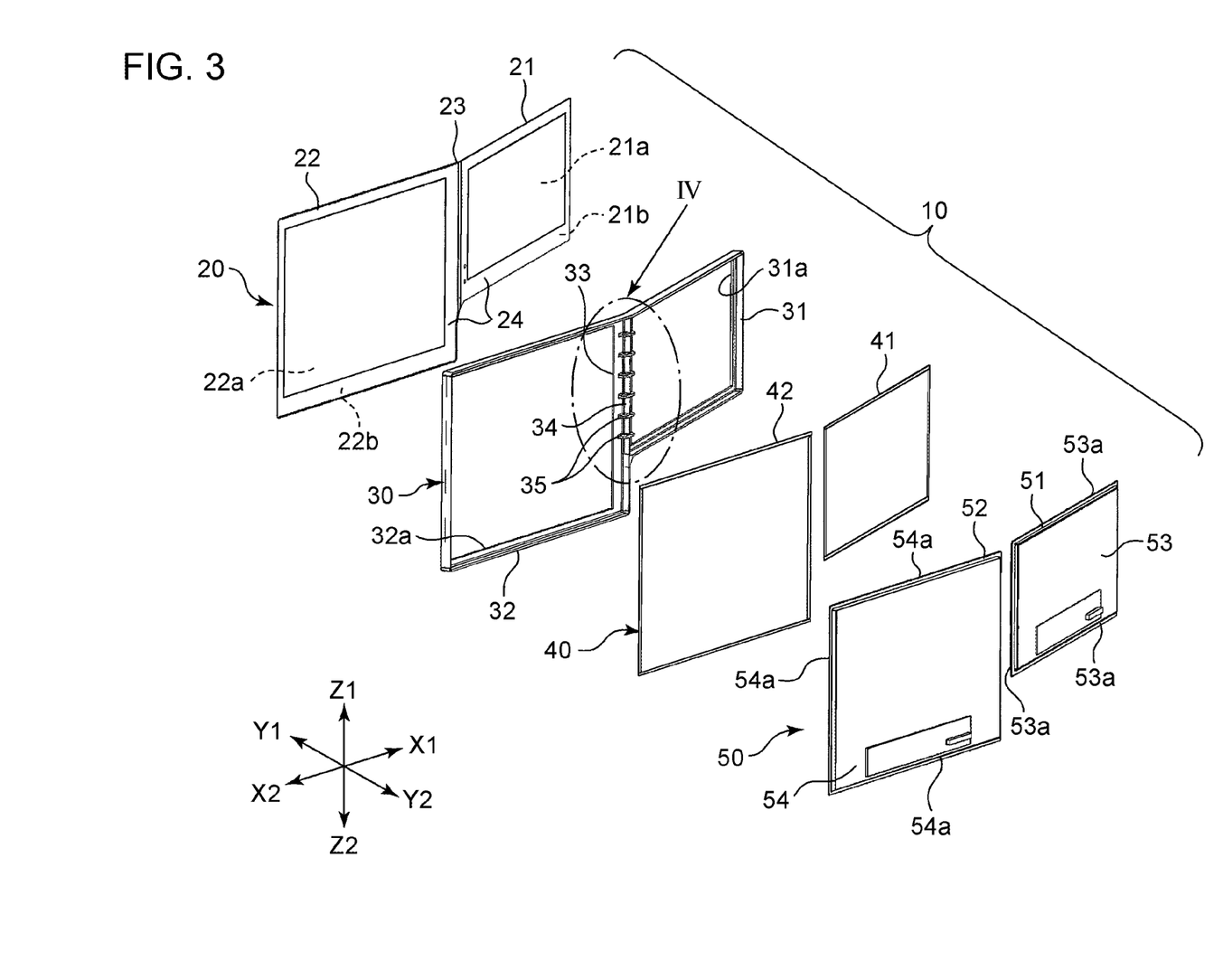
FIG. 3 is an exploded rear perspective view of some components of the display apparatus illustrated in FIG. 1.

As illustrated in FIGS. 1 and 2, the display apparatus 1 includes a rear support member 2 disposed at the rear and a display panel assembly 10 disposed in front of the rear support member 2. The display apparatus 1 is mounted in the vehicle by fixing the rear support member 2 to a portion of a vehicle body. As illustrated in FIGS. 2 and 3, the display panel assembly 10 includes a cover panel 20, a reinforcement member 30, a display cell 40, and a backlight device 50 that are arranged in that order from front to rear and stacked together.

The cover panel 20 is composed of a light-transmissive plate member. In this specification, an object referred to as being light-transmissive has a total light transmittance of, for example, greater than or equal to 60%. More preferably, the total light transmittance is greater than or equal to 70%. The cover panel 20 is a glass plate or a plastic plate. In a preferred embodiment, the cover panel 20 is composed of a glass plate.

Figure 5:
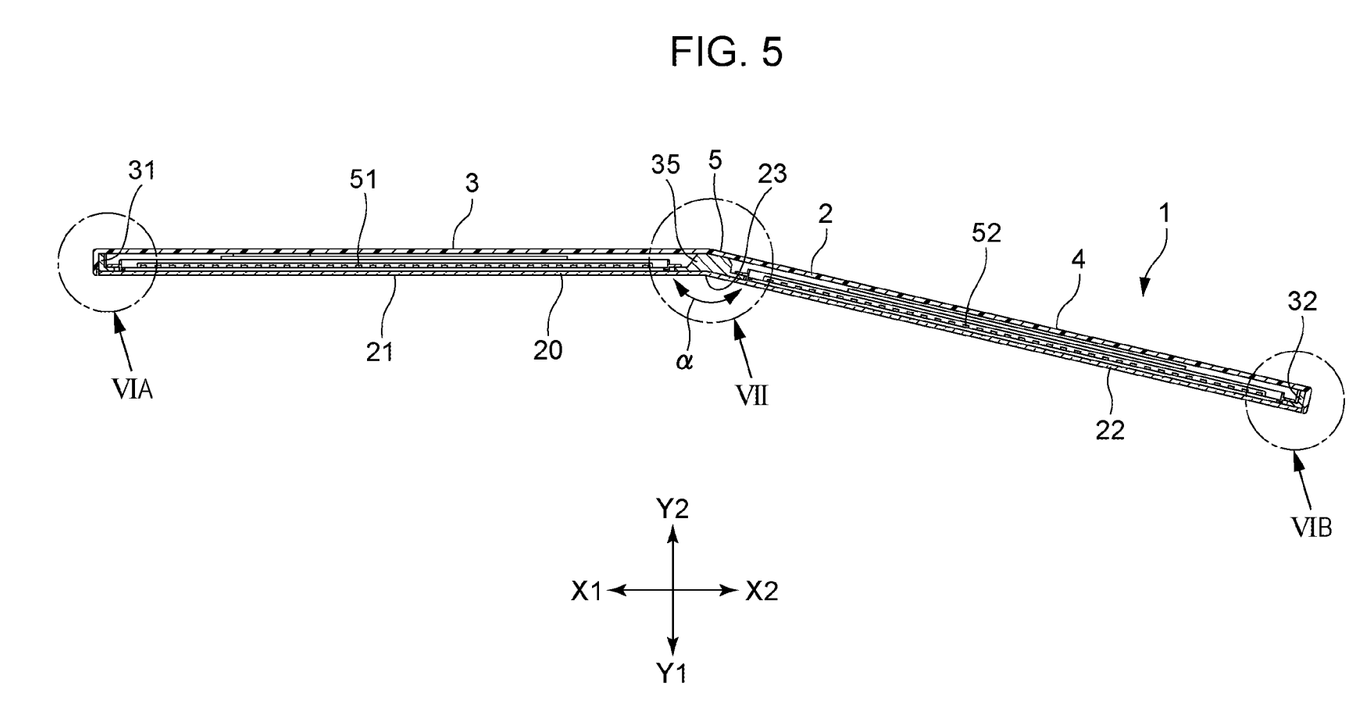
FIG. 5 is a sectional view of the display apparatus illustrated in FIG. 1 taken along line V-V.

The cover panel 20 has a three-dimensional shape, and includes a first flat portion 21 at the left side (X1 side), a second flat portion 22 at the right side (X2 side), and a bent portion 23 at the boundary between the first flat portion 21 and the second flat portion 22. The dimension of the second flat portion 22 in the vertical direction (Z1-Z2 direction) is greater than that of the first flat portion 21, and the area of the second flat portion 22 is greater than that of the first flat portion 21. As illustrated in FIG. 5, the first flat portion 21 and the second flat portion 22 have an opening angle α facing forward (in the Y1 direction) therebetween at the bent portion 23. The opening angle α may be set to any angle in accordance with the design of the display apparatus 1.

Figure 7:
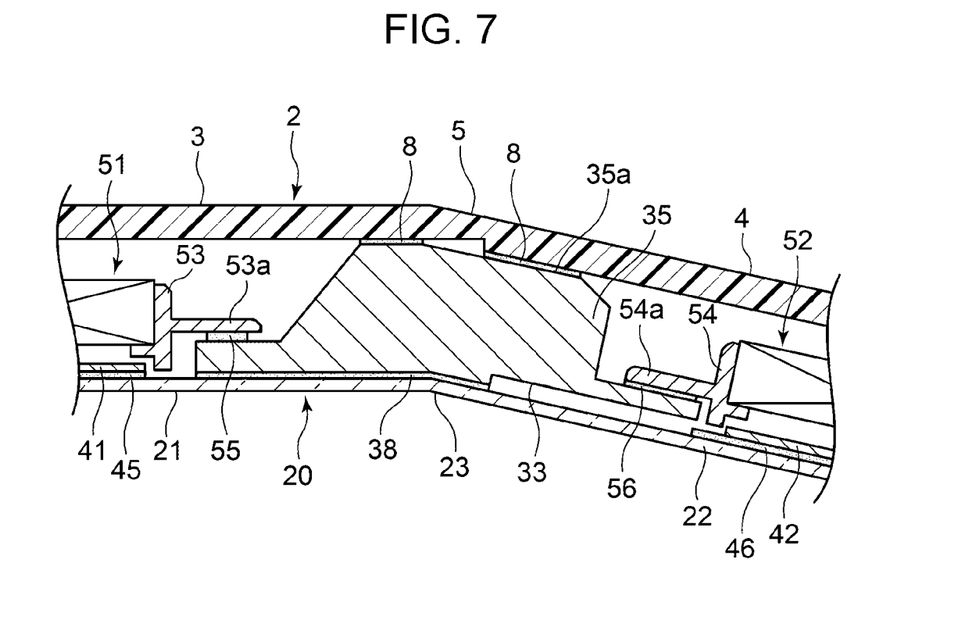
FIG. 7 is an enlarged partial sectional view of part VII in FIG. 5.

As illustrated in the sectional view of FIG. 5 and the enlarged partial sectional view of FIG. 7, the cover panel 20 has a three-dimensional shape. The cover panel 20, which is a glass plate, for example, is bent to form a corner portion or bent with a small curvature in the left-right direction (X1-X2 direction) at the bent portion 23 thereof. In this case, the corner portion or the center of curvature extends in the vertical direction (Z1-Z2 direction). The cover panel 20 may instead have a curved portion between the first flat portion 21 and the second flat portion 22. The curved portion is a portion having a relatively large curvature in the left-right direction (X1-X2 direction). Thus, the cover panel 20 may be bent to form a corner portion or be bent with any curvature, which may large or small, at the boundary between the first flat portion 21 and the second flat portion 22.

The cover panel 20 includes a cover coat, which is a light-transmissive hard film, on a front surface thereof that faces in a forward direction (Y1 direction), which is the displaying direction. The cover panel 20 also includes a frame-shaped light non-transmissive layer (decorative layer) 24 formed on a rear surface thereof that faces in a rearward direction (Y2 direction) by printing or painting. The first flat portion 21 includes a light non-transmissive region (decorative region) 21b, which is a frame-shaped region in which the light non-transmissive layer 24 is formed, and a display region 21a, which is a central region surrounded by the light non-transmissive layer 24. The second flat portion 22 includes a light non-transmissive region (decorative region) 22b, which is a frame-shaped region in which the light non-transmissive layer 24 is formed, and a display region 22a, which is a central region surrounded by the light non-transmissive layer 24. The light non-transmissive layer 24 is also provided on the bent portion 23, and the bent portion 23 is also a light non-transmissive region. A touch panel of an electrostatic capacity detection type or a resistance variation detection type for detecting the coordinate position of a finger contact point is preferably provided on the front surface or the rear surface of the cover panel 20 in at least one of the display regions 21a and 22a.

Figure 4:
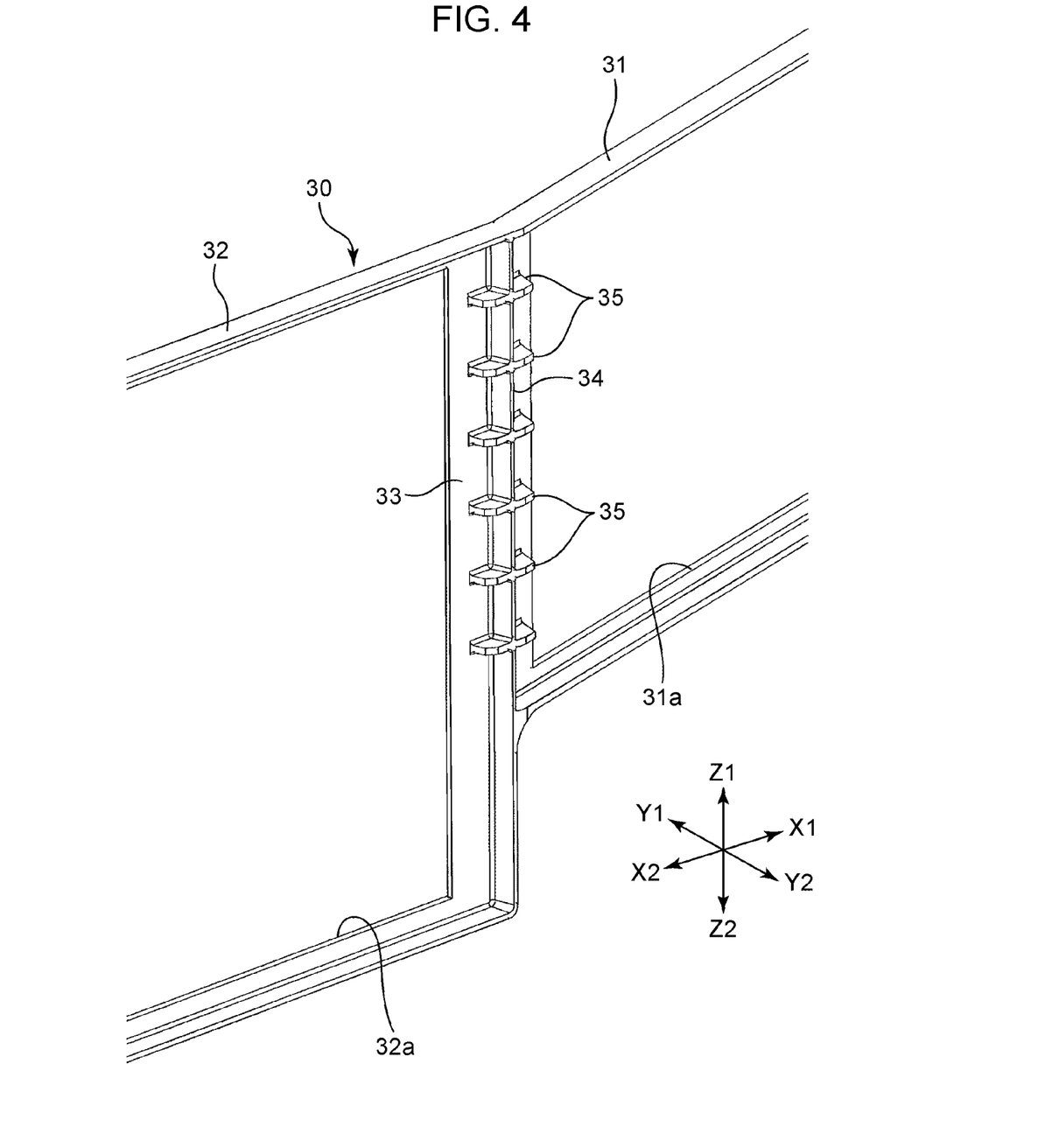
FIG. 4 is an enlarged perspective view of part IV of a reinforcement member illustrated in FIG. 3.

As illustrated in FIGS. 2, 3, and 4, the reinforcement member 30 disposed behind the cover panel 20 is frame-shaped. A columnar-plate-shaped partition portion 33 that extends in the vertical direction (Z1-Z2 direction) is disposed in the frame-shaped reinforcement member 30 and formed integrally therewith. The reinforcement member 30 includes a first frame portion 31 having a rectangular shape on the left side (X1 side) of the partition portion 33 and a second frame portion 32 having a rectangular shape on the right side of the partition portion 33. The first frame portion 31 has a first window portion 31a that opens therein. The first frame portion 31 continuously surrounds the four sides, that is, the top, bottom, left, and right sides, of the first window portion 31a. The second frame portion 32 has a second window portion 32a that opens therein. The second frame portion 32 continuously surrounds the four sides, that is, the top, bottom, left, and right sides, of the second window portion 32a.

The flexural rigidity of the reinforcement member 30 in a curvature direction along every imaginary axis on a plane parallel to the surfaces of the cover panel 20 is greater than the flexural rigidity of the cover panel 20 in the same direction. The torsional rigidity of the reinforcement member 30 about every imaginary axis on a plane parallel to the surfaces of the cover panel 20 is greater than the torsional rigidity of the cover panel 20 about the same imaginary axis. To achieve this, the reinforcement member 30 is produced by die casting by using a metal material, such as magnesium or a magnesium alloy. The flexural rigidity is the product of the geometrical moment of inertia I and the Young's modulus E, and the torsional rigidity is the product of the polar moment of inertia J and the modulus of rigidity G. In this specification, the term "rigidity" includes the concepts of both of the above-described rigidities.

As illustrated in FIG. 4, a vertical rib 34 that extends straight in the vertical direction (Z1-Z2 direction) and a plurality of horizontal ribs 35 arranged with gaps therebetween in the vertical direction (Z1-Z2 direction) are formed integrally with each other on the rear surface of the partition portion 33 of the reinforcement member 30 that faces in the rearward direction (Y2 direction). The vertical rib 34 and the horizontal ribs 35 project rearward (in the Y2 direction) from the partition portion 33. The vertical rib 34 has the shape of a long thin plate whose thickness direction is the left-right direction (X1-X2 direction) and that has plate surfaces parallel to the Y-Z plane. The horizontal ribs 35 have the shape of a plate whose thickness direction is the vertical direction (Z1-Z2 direction) and that have plate surfaces parallel to the X-Y plane. The horizontal ribs 35 extend two-dimensionally in the X1-X2 direction, which is a bending direction or a curving direction, on the rear surface of the partition portion 33.

Figure 6A:
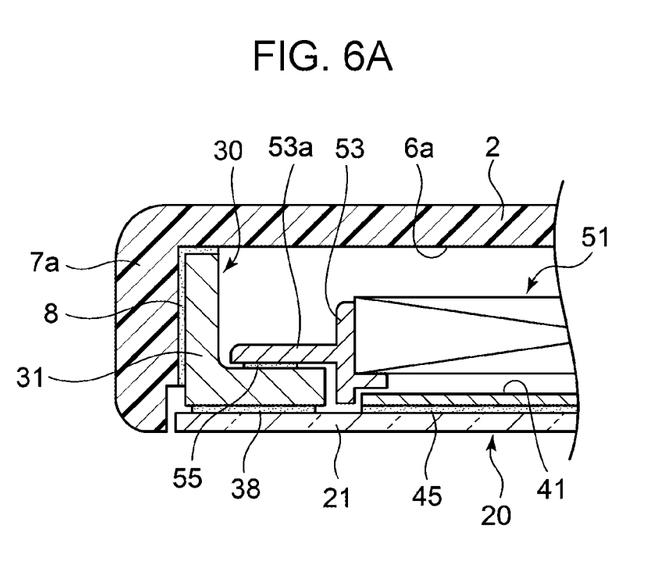
FIG. 6A is an enlarged partial sectional view of part VIA in FIG. 5.
Figure 6B:
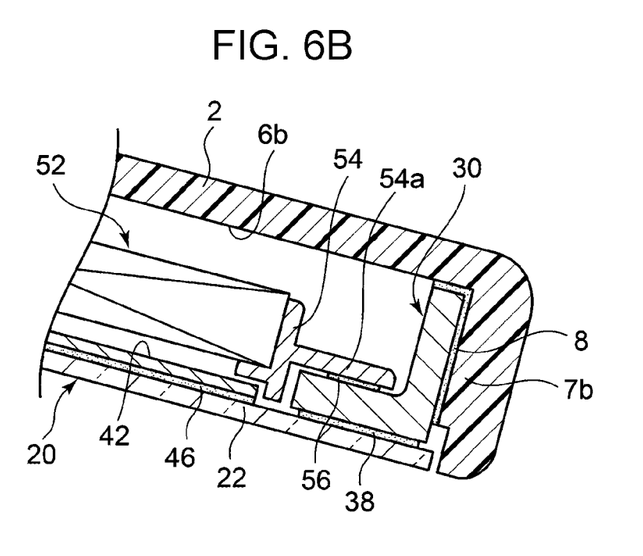
FIG. 6B is an enlarged partial sectional view of part VIB in FIG. 5.

The front surface of the reinforcement member 30 is bonded and fixed to the rear surface of the cover panel 20 that faces in the rearward direction (Y2 direction) with an adhesive layer 38 provided therebetween. The adhesive layer 38 is illustrated in the sectional views of FIGS. 6A, 6B, and 7. As illustrated in FIGS. 6A and 6B, the adhesive layer 38 is provided between the rear surface of the cover panel 20 and the front surface of each of the first frame portion 31 and the second frame portion 32 of the reinforcement member 30, so that the first frame portion 31 and the second frame portion 32 are bonded and fixed to the cover panel 20 over the entire circumferences thereof.

As illustrated in FIG. 7, the adhesive layer 38 is also provided between the front surface of the partition portion 33 of the reinforcement member 30 and the rear surface of the cover panel 20 so that the partition portion 33 and the cover panel 20 are bonded and fixed to each other. In other words, the partition portion 33 is bonded and fixed to the rear surface of the bent portion 23 of the cover panel 20 or the rear surface of a portion on the left or right side of and near the bent portion 23. When the cover panel 20 includes a curved portion, the partition portion 33 is bonded and fixed to the rear surface of at least a portion of the curved portion or a portion on the left or right side of and near the curved portion.

The first frame portion 31 of the reinforcement member 30 is bonded to the light non-transmissive region 21b formed on the first flat portion 21 of the cover panel 20, and the second frame portion 32 is bonded to the light non-transmissive region 22b formed on the second flat portion 22. The partition portion 33 is bonded to the light non-transmissive region in the region including the bent portion 23 of the cover panel 20. Therefore, the reinforcement member 30 is not disposed behind the display regions 21a and 22a of the cover panel 20.

The reinforcement member 30 is produced by die casting by using a metal material. Therefore, the reinforcement member 30 has a high dimensional accuracy, and the front surface of the first frame portion 31 and the front surface of the second frame portion 32 are highly flat. In contrast, since the cover panel 20 is a flat plate, the flatness tolerance of the first flat portion 21 and the second flat portion 22 is large, and the flatness tolerance increases as the areas of the flat portions 21 and 22 increase. In addition, the opening angle $\alpha$ between the first flat portion 21 and the second flat portion 22 illustrated in FIG. 5 has a large variation. The variation in the opening angle $\alpha$ is particularly large when the cover panel 20 is made of glass. However, the first flat portion 21 and the second flat portion 22 of the cover panel 20 are respectively bonded to the first frame portion 31 and the second frame portion 32 of the reinforcement member 30, the partition portion 33 is bonded to the rear surface of the bent portion 23, and the rigidity of the reinforcement member 30 is higher than that of the cover panel 20. Therefore, even when the cover panel 20 has large errors in the flatness and the opening angle $\alpha$ by itself, by fixing the reinforcement member 30 to the cover panel 20, the flatness of the first flat portion 21 and the second flat portion 22 of the cover panel 20 and the accuracy of the opening angle $\alpha$ can be maintained at high levels.

As illustrated in FIG. 4, the vertical rib 34 and the horizontal ribs 35 are formed on the rear surface of the partition portion 33 of the reinforcement member 30. Therefore, the strength of the partition portion 33 of the reinforcement member 30 is increased, and the opening angle $\alpha$ between the first frame portion 31 and the second frame portion 32 does not easily change even when an external force is applied. In the case where the opening angle $\alpha$ of the cover panel 20 differs from that of the reinforcement member 30 and the cover panel 20 is largely distorted, stress is applied to the reinforcement member 30 by the cover panel 20 when the cover panel 20 and the reinforcement member 30 are bonded together. However, also in this case, the reinforcement member 30 is not distorted because the reinforcement member 30 has a high strength. As a result, the flatness of the cover panel 20 and the accuracy of the opening angle $\alpha$ can be maintained at high levels.

The display cell 40 includes a first display cell element 41 and a second display cell element 42 that are independent of each other. The first display cell element 41 and the second display cell element 42 are transmissive liquid crystal display cells. Each liquid crystal display cell includes two light-transmissive substrates having electrode layers on inner surfaces thereof, a liquid crystal layer interposed between the light-transmissive substrates, a color filter provided on the inner surface of one of the light-transmissive substrates, and polarizing layers. The display apparatus 1, which is mounted in a vehicle, preferably includes liquid crystal display cells driven by the IPS method. A liquid crystal display cell driven by the IPS method does not transmit light when no voltage is applied, and therefore has a good appearance when the display cell is not driven. In addition, the liquid crystal display cell driven by the IPS method has a wide viewing angle when driven, and is therefore suitable for use as a large display cell mounted in a vehicle. However, the liquid crystal display cell driven by the IPS method has a problem that the displayed image has unevenness in black display when the liquid crystal display cell is distorted.

As illustrated in FIGS. 6A and 7, the first display cell element 41 is bonded to the rear surface of the first flat portion 21 in the first window portion 31a of the first frame portion 31 of the reinforcement member 30. A front surface of a transparent substrate provided at the front of the first display cell element 41 is bonded and fixed to the rear surface of the first flat portion 21 with a transparent optical adhesive layer 45 provided therebetween over the entire area thereof. As illustrated in FIGS. 6B and 7, the second display cell element 42 is bonded to the rear surface of the second flat portion 22 in the second window portion 32a of the second frame portion 32 of the reinforcement member 30. A front surface of a transparent substrate provided at the front of the second display cell element 42 is bonded and fixed to the rear surface of the second flat portion 22 with a transparent optical adhesive layer 46 provided therebetween over the entire area thereof.

The display panel assembly 10 is configured such that the cover panel 20 is bonded and fixed to the reinforcement member 30 having a high rigidity, so that the flatness of the first flat portion 21 and the second flat portion 22 of the cover panel 20 is maintained at a high level. Therefore, the first display cell element 41 bonded to the first flat portion 21 and the second display cell element 42 bonded to the second flat portion 22 are not largely distorted, so that the occurrence of unevenness in black display in the displayed image can be easily reduced.

The backlight device 50 includes a first backlight 51 and a second backlight 52 that are independent of each other. As illustrated in FIGS. 3 and 6A, the first backlight 51 includes a support body 53 in which a light source and a light guide that guides light from the light source toward the first display cell element 41 are retained. As illustrated in FIGS. 3 and 6B, the second backlight 52 includes a support body 54 in which a light source and a light guide that guides light from the light source toward the second display cell element 42 are retained.

The support body 53 of the first backlight 51 is frame-shaped and includes a flange portion 53a formed along four sides thereof. As illustrated in FIGS. 6A and 7, the flange portion 53a is bonded and fixed to the rear surface of the first frame portion 31 of the reinforcement member 30 with an adhesive layer 55 provided therebetween. The support body 54 of the second backlight 52 is frame-shaped and includes a flange portion 54a formed along four sides thereof. As illustrated in FIGS. 6B and 7, the flange portion 54a is bonded and fixed to the rear surface of the second frame portion 32 of the reinforcement member 30 with an adhesive layer 56 provided therebetween. The first backlight 51 and the second backlight 52 are respectively fixed to the first frame portion 31 and the second frame portion 32 of the reinforcement member 30 without being fixed to the cover panel 20.

The display panel assembly 10, in which the reinforcement member 30 and the display cell 40 are fixed to the cover panel 20 and in which the backlight device 50 is fixed to the reinforcement member 30, is fixed to and supported by the rear support member 2.

The rear support member 2 illustrated in FIGS. 1 and 2 is formed by injection molding by using a synthetic resin material or by die casting by using a metal material. As illustrated in FIG. 2, the rear support member 2 includes a first planar support portion 3, a second planar support portion 4, and a bent portion (or curved portion) 5 located at the boundary between the first planar support portion 3 and the second planar support portion 4. The first planar support portion 3 includes a rear support plate 6a having a rectangular shape and a side wall portion 7a that extends forward (in the Y1 direction) from the top, bottom, and left sides of the rear support plate 6a. The second planar support portion 4 includes a rear support plate 6b having a rectangular shape and a side wall portion 7b that extends forward (in the Y1 direction) from the top, bottom, and right sides of the rear support plate 6b.

The display panel assembly 10 is placed on the rear support member 2. As illustrated in FIG. 6A, the first frame portion 31 of the reinforcement member 30 is bonded and fixed to the front surface of the rear support plate 6a of the rear support member 2 and the inner surface of the side wall portion 7a with an adhesive layer 8 provided therebetween. As illustrated in FIG. 6B, the second frame portion 32 of the reinforcement member 30 is bonded and fixed to the front surface of the rear support plate 6b of the rear support member 2 and the inner surface of the side wall portion 7b with the adhesive layer 8 provided therebetween. In addition, as illustrated in FIG. 7, at least a portion of a rearward-facing end portion 35a of each horizontal rib 35 formed on the rear surface of the partition portion 33 is bonded and fixed to the front surface of the bent portion 5 of the rear support member 2 or a portion near the bent portion 5 with the adhesive layer 8 provided therebetween. Preferably, a rearward-facing end portion of the vertical rib 34 is also bonded to the front surface of the bent portion 5 or a portion near the bent portion 5.

According to the display apparatus 1, the cover panel 20 is bonded and fixed to the reinforcement member 30 having a high rigidity, so that the flatness of the first flat portion 21 and the second flat portion 22 can be maintained at a high level, and that the first display cell element 41 and the second display cell element 42 are not easily distorted. In addition, as illustrated in FIGS. 6A, 6B, and 7, the first frame portion 31, the second frame portion 32, and the partition portion 33 of the reinforcement member 30 are fixed to the rear support member 2, so that the overall strength of the display apparatus 1 is increased. Therefore, even when an external force is applied to the display apparatus 1 when the rear support member 2 is fixed to a vehicle body, the first flat portion 21 and the second flat portion 22 of the cover panel 20 are not easily distorted.

As illustrated in FIGS. 6A and 6B, the first frame portion 31 of the reinforcement member 30 is abutted against and bonded and fixed to the front surface of the rear support plate 6a of the rear support member 2 and the inner surface of the side wall portion 7a that extends along three sides, and the second frame portion 32 is abutted against and bonded and fixed to the front surface of the rear support plate 6b and the inner surface of the side wall portion 7b that extends along three sides. In particular, since the reinforcement member 30 is bonded and fixed to the side wall portion 7a and the side wall portion 7b, which each extend along three sides, with the adhesive layer 8 provided therebetween, the strength of an outer peripheral portion of the rear support member 2 can be maintained at a high level. Accordingly, damage does not easily occur even when an external impact is applied, and edge portions of the cover panel 20 and the reinforcement member 30 are not easily separated from the rear support member 2 in the forward direction.

A method for assembling the display apparatus 1 will now be described.

The display apparatus 1 is assembled by assembling the display panel assembly 10 and then attaching the display panel assembly 10 to the rear support member 2. To assemble the display panel assembly 10, the reinforcement member 30 is bonded and fixed to the rear surface of the cover panel 20 with the adhesive layer 38 interposed therebetween. In this step, even when the cover panel 20 has large errors in the flatness and the opening angle α by itself due to, for example, distortion caused in a forming process, since the cover panel 20 is bonded to the reinforcement member 30 having a rigidity higher than that of the cover panel 20, the cover panel 20 can be bonded and fixed to the reinforcement member 30 such that the shape thereof is corrected. Accordingly, the cover panel 20 can be shaped into a three-dimensional shape corresponding to the shape of the reinforcement member 30. Therefore, after the bonding process, the flatness of the first flat portion 21 and the second flat portion 22 of the cover panel 20 can be maintained at a high level, and the accuracy of the opening angle α between the first flat portion 21 and the second flat portion 22 illustrated in FIG. 5 can also be maintained at a high level.

After the reinforcement member 30 is bonded to the cover panel 20, the first display cell element 41 is bonded to the rear surface of the first flat portion 21 of the cover panel 20 with the optical adhesive layer 45 interposed therebetween in the first window portion 31a of the first frame portion 31 of the reinforcement member 30, and the second display cell element 42 is bonded to the rear surface of the second flat portion 22 with the optical adhesive layer 46 interposed therebetween in the second window portion 32a of the second frame portion 32. In addition, the first backlight 51 is fixed to the first frame portion 31 of the reinforcement member 30 behind the first display cell element 41, and the second backlight 52 is fixed to the second frame portion 32 of the reinforcement member 30 behind the second display cell element 42.

The errors in the flatness and the opening angle α of the cover panel 20 itself are corrected in advance when the cover panel 20 is bonded and fixed to the reinforcement member 30 having a rigidity higher than that of the cover panel 20. Therefore, when the first display cell element 41 and the second display cell element 42 are bonded to the rear surface of the cover panel 20, the display cell elements 41 and 42 are not largely distorted due to the correction of the shape of the cover panel 20. Accordingly, unevenness in black display due to distortion caused during the assembly does not occur on the first display cell element 41 and the second display cell element 42.

After the display panel assembly 10 is assembled by the above-described steps, the display panel assembly 10 is attached to the rear support member 2, and the reinforcement member 30 is fixed to the rear support member 2. Since the reinforcement member 30 is made of a metal and has a high rigidity, even when a stress is applied to the reinforcement member 30 when the reinforcement member 30 is fixed to the rear support member 2, the first frame portion 31 and the second frame portion 32 are not largely distorted. Therefore, the flatness of the first flat portion 21 and the second flat portion 22 of the cover panel 20 can be maintained at a high level after the assembly, and the first display cell element 41 and the second display cell element 42 are not largely distorted. Accordingly, the occurrence of unevenness in black display, for example, can be prevented, and the image quality can be maintained at a high level.

According to the above-described embodiment, the display panel assembly 10 is fixed to the rear support member 2 by fixing the reinforcement member 30 to the rear support member 2, and the backlight device 50 is not bonded and fixed to the rear support member 2. However, the rear surface of the backlight device 50 of the display panel assembly 10 may be bonded and fixed to the rear support member 2 in addition to or instead of bonding and fixing the reinforcement member 30 to the rear support member 2. In other words, according to the present disclosure, at least one of the reinforcement member 30 and the backlight device 50 is bonded and fixed to the rear support member 2. To increase the overall impact strength of the display apparatus 1, the peripheral portion of the reinforcement member 30 is preferably bonded and fixed to the rear support member 2, as illustrated in FIGS. 6A and 6B.

Even when the cover panel 20 has a flat structure and does not have a bent portion or a curved portion, the present invention has an effect of maintaining the flatness of the flat portion of the cover panel 20 to which a display cell is bonded by reinforcing the cover panel 20 with the frame-shaped reinforcement member 30. The display cell may be an electroluminescence display cell that does not include a backlight device. However, the present invention is particularly effective when the display cell is a liquid crystal display cell driven by the IPS method because the unevenness in black display can be effectively prevented.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display apparatus comprising:
   a display cell;
   a cover panel that is light-transmissive and that covers at least a portion of the display cell that faces in a forward direction, which is a displaying direction of the display cell; and
   a reinforcement member that is frame-shaped and has a rigidity higher than a rigidity of the cover panel, the reinforcement member being fixed to a rear surface of the cover panel that faces in a rearward direction,
   wherein:
   the display cell is fixed to the rear surface of the cover panel in a region surrounded by the reinforcement member, and the display cell is not supported by the reinforcement member;
   the cover panel includes a bent portion or a curved portion separating a first flat portion and a second flat portion of the cover panel, and the reinforcement member is fixed to the rear surface of the cover panel at either of the bent portion and a portion near the bent portion, or either of at least a portion of the curved portion and a portion near the curved portion;

the reinforcement member includes a partition portion that partitions an inner space of the frame-shaped reinforcement member, and at least a portion of the partition portion is fixed to the rear surface of the cover panel; and the display cell comprises a first display cell and a second display cell, the first display cell is fixed to a rear surface of the first flat portion, and the second display cell is fixed to a rear surface of the second flat portion.

2. The display apparatus according to claim 1, further comprising:

a backlight device disposed behind the display cell, the backlight device being fixed to the reinforcement member, wherein at least one of the reinforcement member and the backlight device is fixed to a rear support member disposed behind the backlight device.

3. The display apparatus according to claim 2, wherein the partition portion includes a plurality of ribs that project rearward and extend in a direction in which the bent portion is bent or the curved portion is curved, and at least a portion of a rearward-facing end portion of each rib is fixed to the rear support member.

4. A method for assembling a display apparatus including a display cell and a cover panel that is light-transmissive and that covers at least a portion of the display cell that faces in a forward direction, which is a displaying direction of the display cell, the method comprising the steps of:

(a) fixing a reinforcement member that is frame-shaped and has a rigidity higher than a rigidity of the cover panel to a rear surface of the cover panel that faces in a rearward direction; and (b) fixing the display cell to the rear surface of the cover panel in a region surrounded by the reinforcement member after step (a) so that the display cell is not supported by the reinforcement member, wherein:

the cover panel includes a bent portion or a curved portion separating a first flat portion and a second flat portion of the cover panel, and the reinforcement member is fixed to the rear surface of the cover panel at either of the bent portion and a portion near the bent portion, or either of at least a portion of the curved portion and a portion near the curved portion;

the reinforcement member includes a partition portion that partitions an inner space of the frame-shaped reinforcement member, and at least a portion of the partition portion is fixed to the rear surface of the cover panel; and the display cell comprises a first display cell and a second display cell, the first display cell is fixed to a rear surface of the first flat portion, and the second display cell is fixed to a rear surface of the second flat portion.

5. The method according to claim 4, further comprising the steps of:

(c) fixing a backlight device disposed behind the display cell to the reinforcement member after step (b); and (d) fixing at least one of the reinforcement member and the backlight device to a rear support member disposed behind the backlight device.

6. The method according to claim 5, wherein the partition portion includes a plurality of ribs that project rearward and extend in a direction in which the bent portion is bent or the curved portion is curved, and at least a portion of a rearward-facing end portion of each rib is fixed to the rear support member.

* * * * *